C. W. GLOVER.
Oval Lathes for Finishing Hats.

No. 154,859. Patented Sept. 8, 1874.

WITNESSES:

INVENTOR:

ATTORNEYS.

UNITED STATES PATENT OFFICE.

CARLOS W. GLOVER, OF DANBURY, CONNECTICUT, ASSIGNOR TO THE TWEEDY MANUFACTURING COMPANY, OF SAME PLACE.

IMPROVEMENT IN OVAL LATHES FOR FINISHING HATS.

Specification forming part of Letters Patent No. 154,859, dated September 8, 1874; application filed July 25, 1874.

*To all whom it may concern:*

Figure 1:
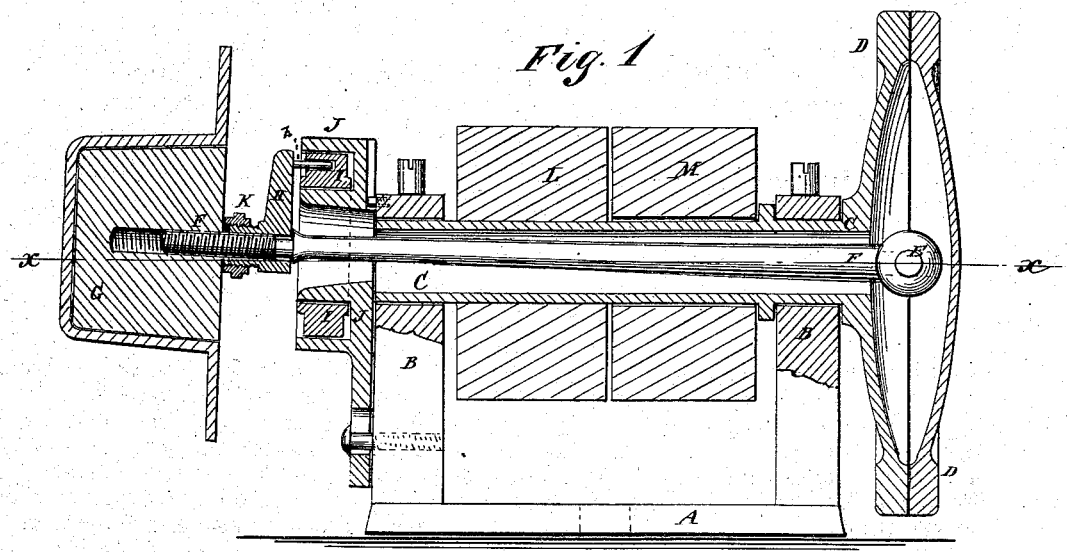
Figure 2:
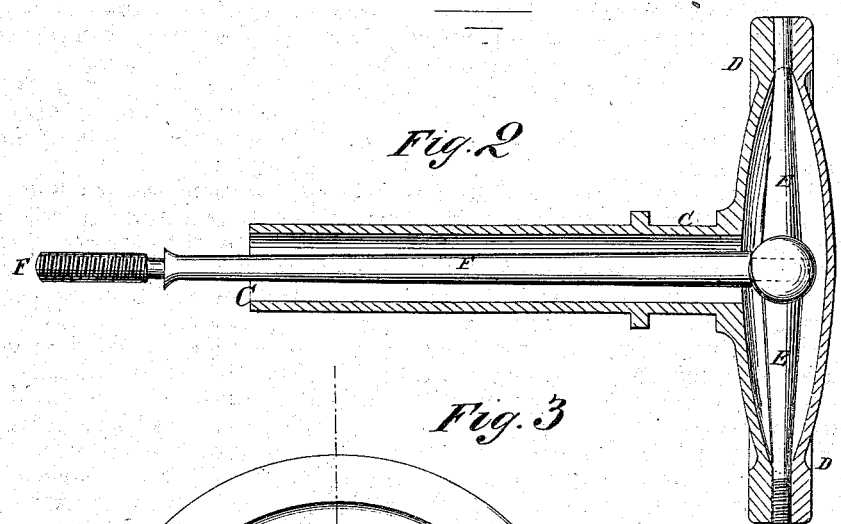
Figure 3:
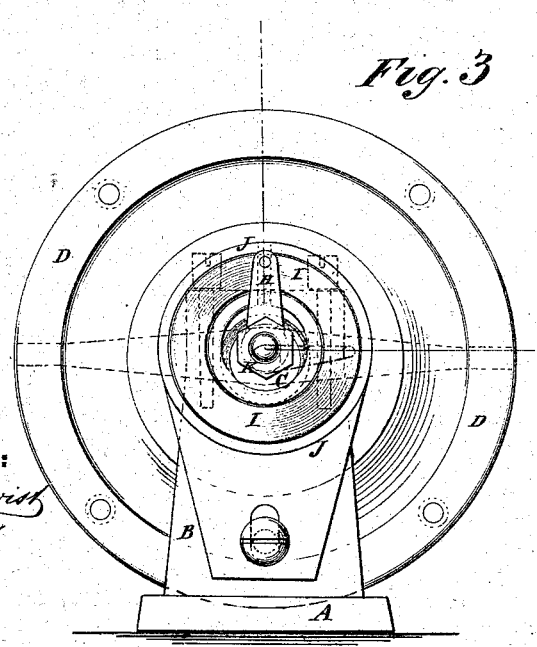

Be it known that I, CARLOS W. GLOVER, of Danbury, in the county of Fairfield and State of Connecticut, have invented a new and useful Improvement in Oval Lathes for Finishing Hats, of which the following is a specification:

Figure 1 is a vertical longitudinal section of my improved machine. Fig. 2 is a detail longitudinal section of the hollow arbor and fly-wheel, showing the cross-head spindle in place. Fig. 3 is a front-end view of the machine.

Similar letters of reference indicate corresponding parts.

The invention will first be fully described, and subsequently pointed out in the claim.

A represents the bed-plate, and B the uprights or frame of the machine. C is a hollow arbor, the journals of which revolve in bearings in the upper ends of the uprights B, and to one of its ends is attached a fly-wheel, D, which, for convenience, I prefer to make hollow and in two parts, with its outer part detachable.

E is a cross-head, the ends of which work in bearings formed in the adjacent surfaces of the rims of the parts of the fly-wheel D. Upon one of the journals of the cross-head E is formed a screw-thread or ring-grooves, fitting into a corresponding screw-thread or ring-grooves in its bearing, to prevent the said cross-head from having a longitudinal movement in its bearings. To the center of the cross-head E is attached, or upon it is formed, the end of a spindle, F, which passes longitudinally through the hollow arbor C, and is made smaller than the cavity of said arbor, and tapering, so that it may have an oscillating movement in said arbor. The tapering form of said spindle, also, makes it strongest where most strength is required.

The end of the spindle F projects beyond the end of the arbor C, and has a screw-thread cut upon it to receive the hat-block G or other work. Upon the screw-thread of the spindle F is also screwed a crank-arm, H, the crank-pin $h$ of which enters a hole in the ring I, which fits into, and works in, a ring-groove in the plate J. The plate J rests against the forward side of the upright B, and is secured in place by a screw-bolt, which passes through a vertical slot in plate J, and screws into the upright B. The plate J is secured in an upright position by a guide-pin attached to the upright B, and which enters a vertical groove in the said plate J, as shown in Fig. 1.

The plate J should have a slight rearward inclination, equal to about half the difference between the centers of the hollow arbor C and ring I.

In using the machine, the plate J should be so adjusted that the center of the ring I may be at a distance above the center of the arbor C equal to the difference between the long and short radiuses of the work.

In using the machine, the crank-arm H should be adjusted exactly at right angles with the cross-head E, and the work should be adjusted with its long diameter parallel with the cross-head E, and its short diameter parallel with the crank H.

With this arrangement, when the crank H is in a vertical position above the spindle F, as shown in full lines in Fig. 3, as it moves through the first quadrant, the spindle moves downward, as shown in dotted lines in Fig. 3, bringing the center of the spindle F into line with the center of the hollow arbor C. As the crank moves through the second quadrant, the spindle moves upward, and again moves downward through the third quadrant, and upward through the fourth quadrant, having thus two upward and two downward movements during each revolution. The effect of this is to keep the upper side of the work always in the same horizontal plane.

Upon the hub of the crank H is cut a screw-thread running in a different direction from the screw-thread of the spindle F, and upon which is screwed a nut, K, which, when the work has been accurately adjusted in position, may be screwed out against said work, and will thus lock it securely in place. Upon the hollow arbor C are placed the fast and loose pulleys L M, to receive the belt by which motion is given to the machine.

Having thus described my invention, I claim as new and desire to secure by Letters Patent—

The cross-head spindle E F, and the crank H and crank-pin h, in combination with the ring I, the adjustable ring-grooved plate J, the hollow arbor C, and the fly-wheel D, substantially as herein shown and described.

CARLOS W. GLOVER.

Witnesses:
TIMOTHY JONES,
DAVID B. BOOTH.